United States Patent
Wang

(10) Patent No.: US 10,990,800 B2
(45) Date of Patent: Apr. 27, 2021

(54) DISPLAY DEVICE AND DISPLAY METHOD THEREOF, ELECTRONIC PICTURE FRAME COMPUTER READABLE STORAGE MEDIUM

(71) Applicant: BOE TECHNOLOGY GROUP CO., LTD., Beijing (CN)

(72) Inventor: Xiaohong Wang, Beijing (CN)

(73) Assignee: BOE TECHNOLOGY GROUP CO., LTD., Beijing (CN)

(*) Notice: Subject to any disclaimer, the term of this patent is extended or adjusted under 35 U.S.C. 154(b) by 110 days.

(21) Appl. No.: 16/204,193

(22) Filed: Nov. 29, 2018

(65) Prior Publication Data
US 2019/0325196 A1 Oct. 24, 2019

(30) Foreign Application Priority Data
Apr. 18, 2018 (CN) .......................... 201810350488.9

(51) Int. Cl.
G06K 9/00 (2006.01)
G06K 9/62 (2006.01)

(52) U.S. Cl.
CPC ..... *G06K 9/00201* (2013.01); *G06K 9/00624* (2013.01); *G06K 9/6256* (2013.01); *G06K 9/6282* (2013.01)

(58) Field of Classification Search
CPC .............. G06K 9/00671; G06K 9/627; G06K 9/00536; G06K 9/00624; G06K 9/6267; G06K 9/6292; G06Q 30/0631
See application file for complete search history.

(56) References Cited

U.S. PATENT DOCUMENTS

| | | | |
|---|---|---|---|
| 10,482,674 B1* | 11/2019 | Wu | G06T 7/00 |
| 2014/0270492 A1* | 9/2014 | Christopulos | G06K 9/627 382/159 |
| 2014/0289069 A1* | 9/2014 | Bhardwaj | G06K 9/4604 705/26.7 |
| 2015/0019342 A1* | 1/2015 | Gupta | G06Q 30/0269 705/14.66 |
| 2015/0363943 A1* | 12/2015 | Yalniz | G06T 7/90 345/591 |
| 2018/0121988 A1* | 5/2018 | Hiranandani | G06K 9/6202 |
| 2019/0000244 A1 | 1/2019 | Mu | |
| 2019/0378204 A1* | 12/2019 | Ayush | G06Q 99/00 |

FOREIGN PATENT DOCUMENTS

| | | |
|---|---|---|
| CN | 103366186 A | 10/2013 |
| CN | 106204165 A | 12/2016 |
| CN | 107016163 A | 8/2017 |
| CN | 107172337 A | 9/2017 |
| CN | 107424019 A | 12/2017 |

OTHER PUBLICATIONS

First Office Action for CN Patent Application No. 201810350488.9 dated May 7, 2020.

* cited by examiner

*Primary Examiner* — Li Liu
(74) *Attorney, Agent, or Firm* — Dinsmore & Shohl LLP

(57) ABSTRACT

The present disclosure relates to a display device and its display device, an electronic picture frame and a computer readable storage medium. The display device includes: a processor configured to acquire an environmental image of the environment where the display device is located, identify a category of the environmental image, and determine one or more pictures matching the category from a picture library; and a display configured to display at least one of the determined pictures.

20 Claims, 3 Drawing Sheets

# DISPLAY DEVICE AND DISPLAY METHOD THEREOF, ELECTRONIC PICTURE FRAME COMPUTER READABLE STORAGE MEDIUM

CROSS-REFERENCE TO RELATED APPLICATIONS

The present application claims priority to Chinese Patent Application No. 201810350488.9, filed on Apr. 18, 2018, the disclosure of which is incorporated hereby in its entirety.

TECHNICAL FIELD

The present disclosure relates to the technical field of intelligent system, and particularly to a display device and a display method thereof, an electronic picture frame, and a computer readable storage medium.

BACKGROUND

With the development of image processing technologies and display technologies, the electronic picture frame, as a display device of art works such as paintings, gains extensive attention.

The electronic picture frame in relevant technologies recommends corresponding paintings according to browse histories of a user.

SUMMARY

According to a first aspect of the embodiments of the present disclosure, a display device is provided, comprising: a processor configured to acquire an environmental image of the environment where the display device is located, recognize a category of the environmental image, and determine one or more pictures matching the category from a picture library; and a display configured to display at least one of the determined one or more pictures.

In some embodiments, the category comprises at least one of a decoration style, a decoration tone, and a furniture type of the environment.

In some embodiments, the processor is configured to recognize the category of the environmental image using a deep learning-based image recognition model.

In some embodiments, the processor is configured to determine the one or more pictures matching the category using a decision tree model.

In some embodiments, the processor is configured to determine the one or more pictures matching the category according to a priority of the category.

In some embodiments, the priority of the category is ranked as decoration style>decoration tone>furniture type.

In some embodiments, the display is further configured to display a list of the one or more pictures.

In some embodiments, the display is configured to display the at least one of the one or more pictures in the list upon a user's selection.

In some embodiments, the display device further comprises: an image sensor configured to sense the environmental image of the environment where the display device is located.

According to a second aspect of the embodiments of the present disclosure, a display method is provided comprising: acquiring an environmental image of the environment where a display device is located; recognizing a category of the environmental image; determining one or more pictures matching the category from a picture library; and causing the display device to display at least one of the determined one or more pictures.

In some embodiments, the category comprises at least one of a decoration style, a decoration tone, and a furniture type of the environment.

In some embodiments, the category of the environmental image is recognized using a deep learning-based image recognition model.

In some embodiments, according to the category of the environmental image, a corresponding input image is selected for training the image recognition model, wherein the input image is labelled with a single label or multiple labels.

In some embodiments, the one or more pictures matching the category is determined using a decision tree model.

In some embodiments, the one or more pictures matching the category is determined according to a priority of the category, wherein the priority of category is ranked as decoration style>decoration tone>furniture type.

In some embodiments, the display method further comprises: causing the display device to display a list of the one or more pictures.

In some embodiments, the at least one of the one or more pictures in the list is displayed upon a user's selection.

According to a third aspect of the embodiments of the present disclosure, a display device is provided, comprising: a memory; and a processor coupled to the memory, wherein the processor is configured to perform the display method according to any of the above embodiments based on instructions stored in the memory.

According to a fourth aspect of the embodiments of the present disclosure, an electronic picture frame is provided, comprising: the display device according to any of the above embodiments.

According to a fifth aspect of the embodiments of the present disclosure, a computer readable storage medium is provided on which a computer program is stored, wherein the program, when executed by the processor, implements the display method according to any of the above embodiments.

Further features of the present disclosure and advantages thereof will become apparent from the following detailed description of exemplary embodiments with reference to the attached drawings.

BRIEF DESCRIPTION OF THE DRAWINGS

The accompanying drawings, which constitute a part of the specification, illustrate the embodiments of the present disclosure and, together with the description, serve to explain the principles of the present disclosure.

The present disclosure will be understood more clearly according to the following detailed description with reference to the accompanying drawings, wherein.

Please be appreciated that, the sizes of various portions shown in the accompanying drawings are not drawn to actual scale. Furthermore, identical or similar reference numerals are used to refer to identical or similar members.

DETAILED DESCRIPTION

Various exemplary embodiments of the present disclosure will be described in detail with reference to the accompanying drawings in the following. The following description of the exemplary embodiments is merely illustrative in nature and is in no way intended to limit the present disclosure, its application, or uses. The present disclosure may be implemented in many different forms and is not limited to the embodiments described herein. These embodiments are provided merely for making the present disclosure thorough and complete, and sufficiently expressing the scope of the present disclosure to one of ordinary skill in the art. It should be noted that the relative arrangement of the components and steps, and numerical values set forth in these embodiments are interpreted to be merely illustrative instead of restrictive, unless it is specifically stated otherwise.

The word "comprise" or "include" or the like used in the present disclosure means that an element preceding the word covers elements listed following the word, but does not preclude the possibility of covering also other elements.

All terms (including technical or scientific terms) used in the present disclosure have the same meanings as understood by one of ordinary skill in the art, unless otherwise specifically defined. It should also be understood that the terms defined in common dictionaries should be interpreted as having meanings consistent with their meanings in the context of the relevant technologies, but should not be interpreted with idealized or extremely formalized meanings, unless otherwise expressly defined herein.

Techniques, methods and apparatus as known by one of ordinary skill in the relevant art may not be discussed in detail, but are intended to be regarded as a part of the specification where appropriate.

The electronic picture frame in the relevant technologies does not take into account its environment when recommending paintings, so the recommended paintings often do not match the environment.

In view of this, the present disclosure proposes an environment-adaptive technical solution, capable of recommending works matching the environment where the display device is located, and displaying them in the form of for example pictures.

Figure 1:
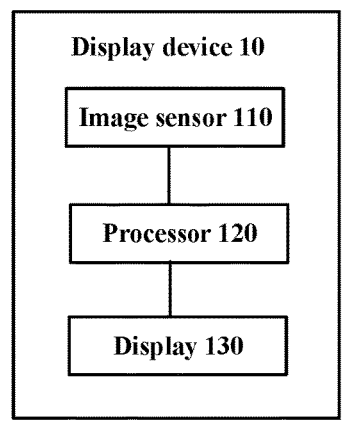
FIG. 1 is a block diagram showing a display device according to some embodiments of the present disclosure.

FIG. 1 is a block diagram showing a display device according to some embodiments of the present disclosure. As shown in FIG. 1, the display device 10 comprises a processor 120 and a display 130.

Processor 120 is configured to acquire an environmental image of the environment where the display device is located.

In some embodiments, the display device 10 further comprises an image sensor 110. The processor 120 can acquire the environmental image of the environment where the display device is located from the image sensor 110. The image sensor 110 is configured to sense the environmental image of the environment where the display device is located. In some embodiments, the image sensor is a camera disposed on the display device, such as a wide-angle camera or a rotatable camera, capable of acquiring the environmental image of the environment from various angles. The environmental image acquired by such a camera can more sufficiently reflect the features of the environment where the display device is located. It should be understood that the image sensor may be not a component of the display device, but external to the display device.

The processor 120 is further configured to recognize a category of the environmental image. In some embodiments, the processor 120 is configured to recognize the category of the environmental image using a deep learning-based image recognition model. The image recognition model can be trained in advance. For example, a VGG network based on caffe (convolutional Architecture for Fast Feature Embedding) can be selected for training the image recognition model. Of course, other image recognition models, such as ResNetin, GoogLeNet can be used.

Figure 2:
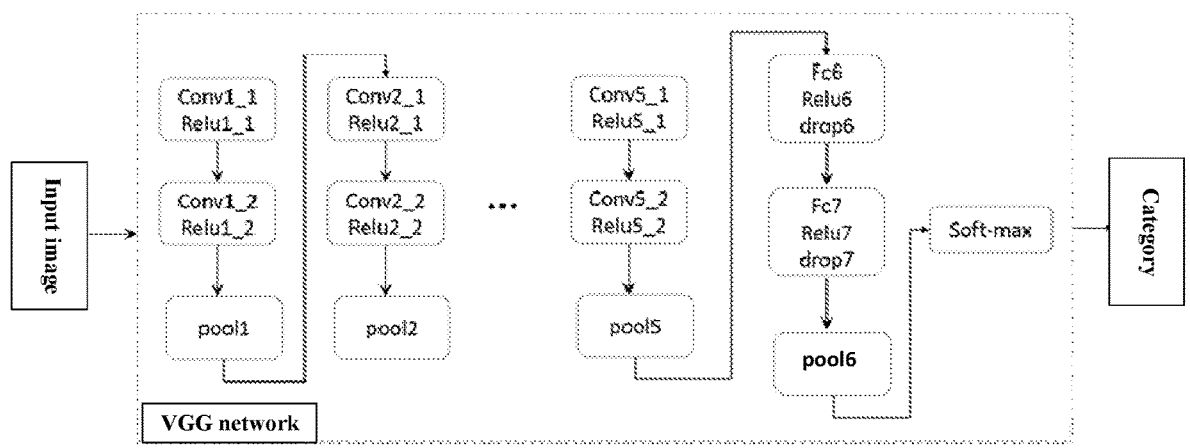
FIG. 2 is a schematic diagram showing a VGG network according to some embodiments of the present disclosure.

FIG. 2 is a schematic diagram showing a VGG network according to some embodiments of the present disclosure.

As shown in FIG. 2, the VGG network comprises a convolution layer (Cony), an activation layer (Relu), a pooling layer (pool), a fully connected layer (Fc), a drop layer (drop), and an output layer (Soft-max).

As an example, as shown in FIG. 2, the VGG network may comprise five convolution layers (i.e., Conv1, Conv2, Conv3, Conv4, Conv5), two fully connected layers (i.e., Fc6, Fc7) and an output layer (i.e., Soft-max). Each convolution layer is further divided into two sublayers, for example, Conv1 comprises Conv1_1 and Conv1_2.

Each convolution layer is equivalent to a filter in image processing, for extracting a kind of image features, such as edges, colors, and etc. By use of the convolution layer, the most basic features in the image can be extracted. The fully connected layer is used for synthesizing the features extracted by the convolution layer. The output layer is used for predicting a probability of the category of the input image according to the output of the fully connected layer.

As shown in FIG. 2, each convolution layer and each fully connected layer is followed by an activation layer, for making nonlinear mapping on the output of the convolution layer or the fully connected layer. For example, the convolution layer conv1_1 is followed by the activation layer relu1_1, and the fully connected layer Fc6 is followed by the activation layer Relu6. The activation layer of the fully connected layer is further followed by a drop layer, for randomly dropping data of some nodes during the training to prevent the model from overfitting. For example, the activation layer Relu6 is followed by the drop layer drop6.

As can be also seen from FIG. 2, there further comprises a pooling layer between the convolution layers, between the convolution layer and the fully connected layer, and between the fully connected layer and the output layer, respectively, for compressing the data amount and preventing the model from overfitting. For example, there is a pooling layer pool1 between the convolution layers Conv1 and Conv2, a pooling layer pool5 between the convolution layer Conv5 and the fully connected layer Fc6, and a pooling layer pool6 between the fully connected layer Fc7 and the output layer Soft-max.

A corresponding input image can be selected for training the recognition model according to a different category of the environmental image. For example, the category of the environmental image may comprise at least one of a decoration style, a decoration tone, and a furniture type of the environment. In this regard, a large number of corresponding environmental images can be collected, respectively reflecting different decoration styles, decoration tones and furniture types, so that they are input to the recognition model for learning.

In addition, in order to improve learning efficiency, supervised learning can be adopted. That is, for each input image, its category is labelled respectively according to the decoration style, the decoration tone, the furniture type, and the category predicted by the output layer is compared with the labelled category, and the results of the comparison are fed back to the recognition model. With the help of the feedback, the recognition model can be trained to recognize the category of the input image more quickly and more accurately. Table 1 below shows some examples of different categories of environmental images.

TABLE 1 some examples of different categories of environmental images

| category | Examples |
| --- | --- |
| decoration style | Chinese, American, European, Japanese, Mediterranean, neo-pragmatic, postmodern, simple, countryside |
| decoration tone | bright, dark, dense, pale, solid, cloudy, cold, warm |
| furniture type | bed, bedside tables, quilt, dresser, wardrobe, TV cabinet, sofa, coffee table, dining table, dining chairs |

Here, the category can be labelled in different ways as needed. For example, different categories can be labeled with different labels. The following shows some examples of category labeling for N input images Image1-ImageN:

Image1.label 1
Image2. label 2 6
Image3.label 7
Image4. label 3 7 9
Image4. label 10
. . .
ImageN. label m where label 1-label m respectively represent different category labels, and m is the number of the kinds of category labels. For example, the decoration style can be labeled with labels label 1-label 5 to respectively label Chinese, American, European, Japanese decoration styles, the decoration tone can be labeled with labels label 6-label 7 to respectively label cold and warm tones, and the furniture type can be labeled with labels label 8-label 10 to respectively label dining room furniture, bed room furniture, and living room furniture.

In the examples above, some input images are labelled with a single label, and some other images are labelled with multiple labels. For an input image, it can be label with only one of the decoration style, the decoration tone, and the furniture type, for example, Image1.label 1, Image3.label 7, and Image4. Label 10 respectively labelling Chinese decoration style, warm tone and living room furniture. Also, the input image can be labelled with both the decoration style and the decoration tone, for example, Image2. Label 2 6 labelling American decoration style and cold tone. If the input image contains furniture, the furniture type can also be labeled, for example, Image4. Label 3 7 9 labelling European decoration style, warm tone, and bed room furniture.

In some embodiments, by taking into account that different furniture may correspond to the same spatial environment, for example, dining table, dining chairs and so on correspond to the dining room, in case where the input image contains the same category of furniture, sub-labels can be also adopted to further label different furniture. For example, while the dining table and the dining chairs are labelled with the label 10 to show that all of them are the dining room furniture, sub-labels a, b can be further adopted to represent different furniture.

The processor 120 is further configured to determine one or more pictures matching the category of the environmental image from a picture library. That is, the processor can decide based on the recognized the category of the environmental image which pictures match that category. The above-mentioned labelled images can be used not only for training the image recognition model, but also for constructing and training a decision model.

Figure 3:
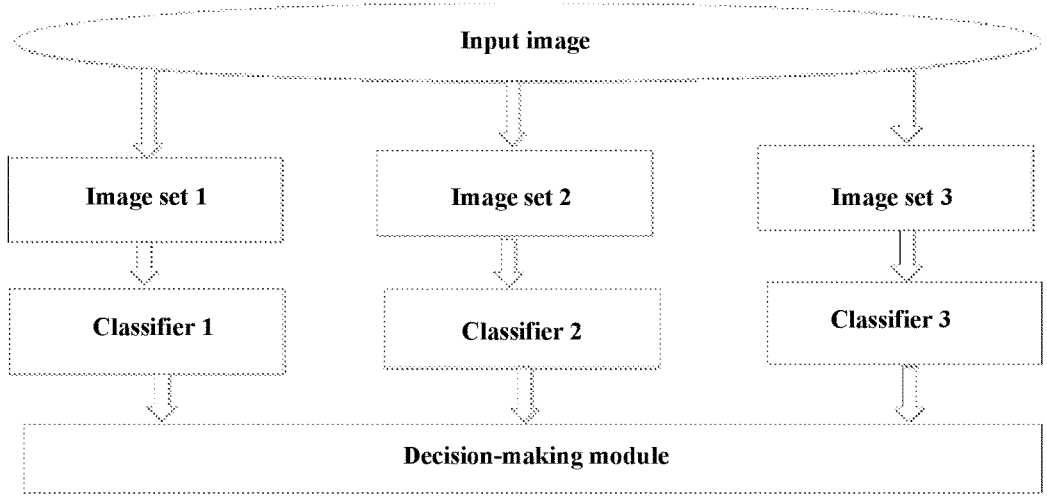
FIG. 3 is a schematic diagram showing a decision-making process according to some embodiments of the present disclosure.

FIG. 3 is a schematic diagram showing a decision-making process according to some embodiments of the present disclosure.

How to make decisions is described in the following by taking that the category of the environmental image includes decoration style, decoration tone, and furniture type as an example. First, the labelled input images can be divided into three image sets according to the decoration style, the decoration tone, the furniture type, namely, image set 1, image set 2, image set 3. Second, one classifier is trained respectively for each image set. Finally, the decision-making module makes decisions based on the results of voting by these classifiers.

The decoration style mainly helps decision making, such that for example, Chinese ink paintings more match the Chinese decoration style, and more harmonize with the environment. The decoration tone mainly helps decision making as to whether the tone of the work matches the tone of the environment. The furniture type mainly helps to determine the space where the display device is located, such as living room, bed room, so as to decide to display different types of works in different spaces.

In some embodiments, the decision-making module can adopt a decision tree model, that is, the decision tree model can be used to determine pictures matching the recognized category of the environmental image.

In the construction stage of the decision tree model, first, a training data set DB can be constructed according to the category labeling of the decoration style, the decoration tone, the furniture type, and the selective setting of the matching pictures; then the decision tree model can be constructed according to the training data set. Thus, a mapping between the category and the training data set can be established, i.e., Class=DecisonTree(DB).

In the decision-making stage, starting from a root node of the decision tree, the tree can be divided downwards layer by layer according to the different categories until leaf nodes, thereby obtaining decision results. Therefore, a mapping between the matching pictures and the category of the environmental image can be established, i.e., Y=DecisonTree(x), where x is the category of the environmental image determined by the three classifiers, and Y is a picture that matches the identified category.

In some embodiments, different categories can have different priorities when making decisions using the decision tree. That is, pictures matching the recognized category can be determined according to the priorities of the different categories. For example, the priorities of the different categories can be ranked as decoration style>decoration tone>furniture type.

In this case, the process of making decisions using a decision tree can comprise the following steps: first, determining which decoration style the environmental image belongs to, e.g., Chinese type or American type; second, determining which decoration tone the environmental image belongs to, e.g., cold tone or warm tone; third, determining which furniture type the furniture in the environment belongs to, e.g., a living room furniture type to which sofa, coffee tables etc. correspond, or a bedroom furniture type to which bed, bedside tables etc. correspond.

Through the above series of determinations, pictures matching the environment can be determined. For example, for the environment of American style, warm tone, and the furniture type having sofa, coffee table etc., works such as modern landscape oil paintings can be determined as matching pictures. Determining matching pictures according to such a priority can make the decision making more efficient and the results more accurate.

The display 130 is configured to display pictures matching the environment, which can be one or more. The display 130 can randomly display any one of the matching pictures. The display 130 can also display multiple matching pictures in order at a certain time interval. The display 130 can also display a list of matching pictures for the user to choose which pictures to be displayed. Such a display can give consideration to both the environmental harmonization and the user's requirement.

According to some embodiments of the present disclosure, an electronic picture frame is further provided, comprising: the display device according to any of the above embodiments. When the electronic picture frame is used, the environmental image of the environment can be acquired through a camera disposed on the frame. Based on the well-trained image recognition model, categories such as the decoration style, decoration tone, furniture type of the environment can be determined from the environmental image. Based on the well-trained decision-making model, paintings matching the environment can be recommended according to the determined category. By displaying thus recommended paintings, the electronic picture frame, as a part of the home decoration, more harmonizes with the environment.

Figure 4:
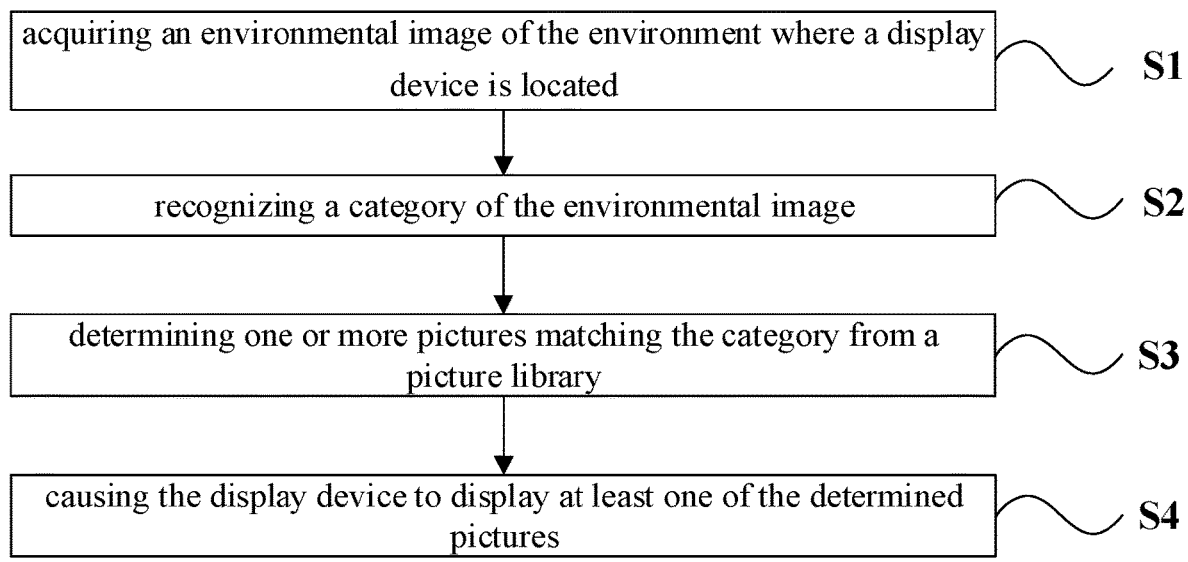
FIG. 4 is a flowchart showing a display method according to some embodiments of the present disclosure.

FIG. 4 is a flowchart showing a display method according to some embodiments of the present disclosure.

As shown in FIG. 4, the display method comprises step S1-S4.

In step S1, an environmental image of the environment where the display device is located is acquired. The environmental image can be sensed by an image sensor. As mentioned before, the environmental image of the environment can be acquired from various angles by means of for example a wide-angle camera disposed on the display device, to more sufficiently reflect the features of the environment where the display device is located.

In step S2, the category of the environmental image is recognized. In some embodiments, a deep learning-based image recognition model is used to recognize the category of the environmental image. As described before, the image recognition model can be trained in advance by adopting for example a VGG Network, and according to a different category of the environmental image, a corresponding input image can be selected for the training of the recognition model.

For example, the category of the environmental image can include decoration style, decoration tone, furniture type, etc. In this regard, a large number of corresponding environmental images can be collected, respectively reflecting different decoration styles, decoration tones and furniture types, so that they are input to the recognition model for learning.

By using such an image recognition model, the category of the environmental image, e.g., which decoration type it belongs to, which decoration tone it belongs to, and which furniture type the furniture in the environment belongs to, can be accurately recognized.

In step S3, one or more pictures matching the category of the environmental image from the picture library is determined. As described before, a decision tree model can be used for determining pictures matching the category of the environmental image.

In some embodiments, different categories have different priorities when using the decision tree for decision making. For example, in case where the priorities are ranked as decoration style>decoration tone>furniture type, the decision-making first determines which decoration style the environmental image belongs to, and then determines which decoration tone it belongs to, and finally determines which furniture type the furniture in the environment belongs to.

Based on the series of determination results of the decision tree, pictures matching the environment can be determined. For example, for an environment of Chinese style, cold tone, and furniture type having bed, bedside tables etc., works such as Chinese ink painting can be determined as matching pictures.

In step S4, the display device is caused to display pictures matching the environment, i.e., at least one of the pictures determined in the step S3. As described before, any of the matching pictures can be randomly displayed. Multiple matching pictures can be also displayed in order at a certain time interval. A list of matching pictures can be displayed, i.e., recommending some matching pictures to the user so that the user chooses which pictures to be displayed.

In the above embodiments, matching works are displayed according to the environment where the display device is located, such that the displayed works more harmonize with the environment.

Those skilled in the art would appreciate that, the method and device of the present disclosure can be implemented in many ways. For example, the method and device of the present disclosure can be implemented by software, hardware, firmware, or any combination of software, hardware, and firmware.

Figure 5:
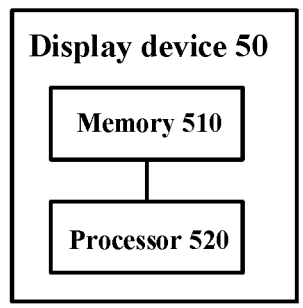
FIG. 5 is a block diagram showing a display device according to some other embodiments of the present disclosure.

FIG. 5 is a block diagram showing a display device according to some other embodiments of the present disclosure.

As shown in FIG. 5, the display device 50 includes a memory 510 and a processor 520. The memory 510 can include, for example, magnetic disk, flash memory, or any other nonvolatile storage medium. The memory 510 is used for storing instructions in the corresponding embodiments of the display method. The processor 520 is coupled to the memory 510 and can be implemented as one or more integrated circuits, such as microprocessors or microcontrollers. The processor 520 is used for executing the instructions stored in the memory 510, to perform the display method according to any of the above embodiments.

Figure 6:
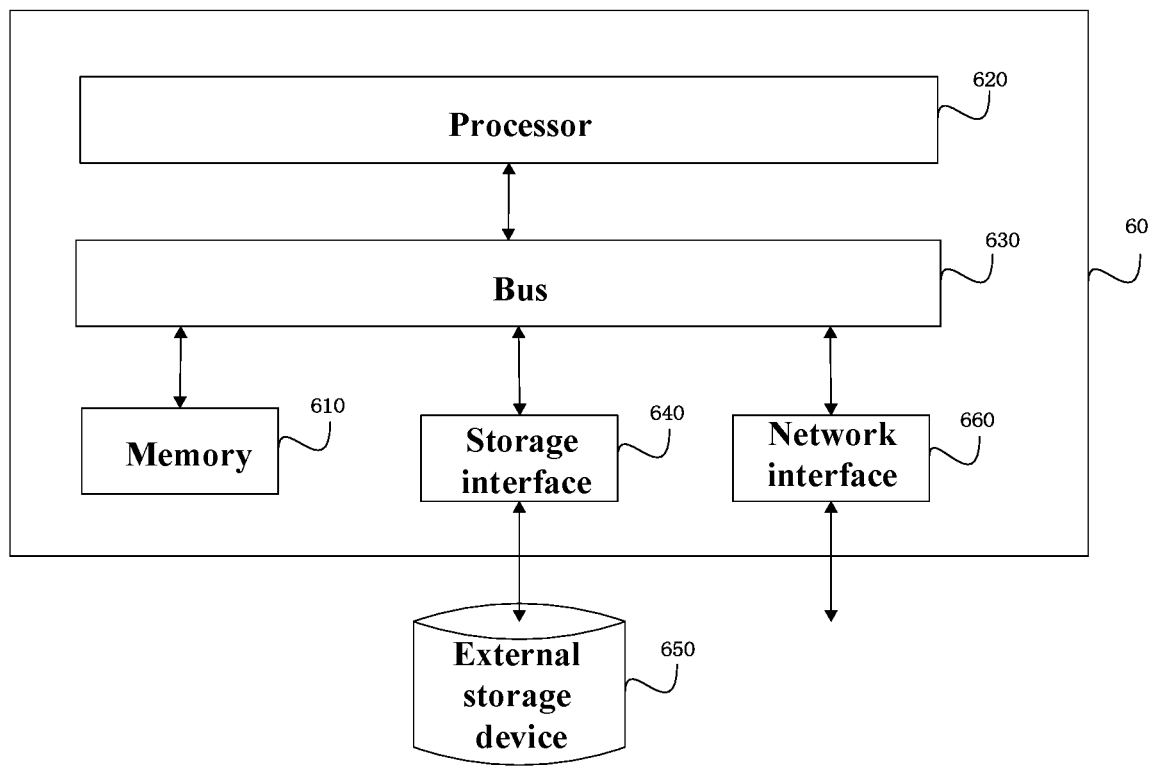
FIG. 6 is a block diagram showing a display device according to some further embodiments of the present disclosure.

FIG. 6 is a block diagram showing a display device according to some further embodiments of the present disclosure.

As shown in FIG. 6, in the display device 60, the processor 620 is coupled to the memory 610 via a bus 630. The display device 60 can be also connected to an external storage device 650 via a storage interface 660 to invoke external data, and also connected to the network or another computer system (not shown) via a network interface 660. A detailed discussion is omitted here.

In some embodiments, by storing data instructions through the memory 610, and then by processing the instructions by the processor 620, the display method according to any of the above embodiments can be implemented.

In addition, in some embodiments, the present disclosure may be also in the form of a computer program product that is implemented on one or more computer available non-instantaneous storage medium (including but not limited to disk memory, CD-ROM, optical memory, etc.) containing computer available program codes. A computer program recorded in the recording medium comprises machine-readable instructions for implementing the method according to the present disclosure, which, when executed by the processor, can implement the display method according to any of the above embodiments.

So far, the display device and its display method, and the computer readable storage medium according to the present disclosure have been described in detail. In order to avoid obscuring the idea of the present disclosure, some details well known in the art are omitted. A person skilled in the art can fully understand how to implement the technical solutions disclosed herein according to the above description.

Although some specific embodiments of the present disclosure have been described in detail with examples, it should be understood by a person skilled in the art that the above examples are only intended to be illustrative but not to limit the scope of the present disclosure. A person skilled in the art would appreciate that, the above embodiments can be modified or partial technical features thereof can be equivalently substituted without departing from the scope and spirit of the present disclosure. The scope of the present disclosure is defined by the attached claims.

What is claimed is:

1. A display device, comprising:
    a processor configured to acquire an environmental image of the environment where the display device is located, recognize a category of the environmental image, and determine one or more pictures matching the category from a picture library, wherein the category comprises a decoration style, a decoration tone, and a furniture type of the environment; and
    a display configured to display at least one of the determined one or more pictures.

2. The display device according to claim 1, wherein the processor is configured to: recognize the category of the environmental image using a deep learning-based image recognition model.

3. The display device according to claim 1, wherein the processor is configured to: determine the one or more pictures matching the category using a decision tree model.

4. The display device according to claim 3, wherein the processor is configured to: determine the one or more pictures matching the category according to a priority of the category.

5. The display device according to claim 4, wherein the priority of the category is ranked as decoration style>decoration tone>furniture type.

6. The display device according to claim 1, wherein the display is configured to display a list of the one or more pictures and display the at least one of the one or more pictures in the list upon a user's selection.

7. The display device according to claim 1, further comprising:
    an image sensor configured to sense the environmental image of the environment where the display device is located.

8. A display method, comprising:
    acquiring an environmental image of the environment where a display device is located;
    recognizing a category of the environmental image, wherein the category comprises a decoration style, a decoration tone, and a furniture type of the environment;
    determining one or more pictures matching the category from a picture library; and
    causing the display device to display at least one of the determined one or more pictures.

9. The display method according to claim 1, wherein the category of the environmental image is recognized using a deep learning-based image recognition model.

10. The display method according to claim 9, wherein, according to the category of the environmental image, a corresponding input image is selected for training the image recognition model, the input image being labelled with a single label or multiple labels.

11. The display method according to claim 8, wherein the one or more pictures matching the category is determined using a decision tree model.

12. The display method according to claim 11, wherein the one or more pictures matching the category is determined according to a priority of the category, wherein the priority of category is ranked as decoration style>decoration tone>furniture type.

13. The display method according to claim 12, wherein the determining one or more pictures matching the category from a picture library comprises:
    sequentially determining which decoration style the environmental image belongs to, which decoration tone the environmental image belongs to, and which furniture type furniture in the environment belongs to; and
    determining one or more pictures matching the decoration style, the decoration tone and the furniture type.

14. The display method according to claim 12, further comprising:
    constructing a training data set according to category labeling of decoration style, decoration tone and furniture type; and
    constructing a decision tree model according to the training data set, to establish a mapping between the category and the training data set.

15. The display method according to claim 14, wherein:
    dividing labelled input images into three image sets according to the decoration style, the decoration tone and the furniture type;
    training one classifier for each image set; and
    making decisions based on results of voting by classifiers of the three image sets.

16. The display method according to claim 15, wherein the making decisions based on results of voting by classifiers of the three image sets comprises:
    starting from a root node of the decision tree model, dividing the decision tree model downwards layer by layer according to different categories until leaf nodes, to obtain decision results.

17. The display method according to claim 8, further comprising:
    causing the display device to display a list of the one or more pictures.

18. The display method according to claim 17, wherein the at least one of the one or more pictures in the list is displayed upon a user's selection.

19. A display device, comprising:
    a memory; and
    a processor coupled to the memory, wherein the processor is configured to perform the display method according to claim 8 based on instructions stored in the memory.

20. A non-transitory computer readable storage medium on which a computer program is stored, wherein the program, when executed by a processor, implements the display method according to claim 8.

\* \* \* \* \*